United States Patent

Shibata

(10) Patent No.: US 9,581,754 B2
(45) Date of Patent: Feb. 28, 2017

(54) LIQUID CRYSTAL DISPLAY DEVICE

(71) Applicant: Japan Display Inc., Tokyo (JP)

(72) Inventor: Michihide Shibata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/197,259

(22) Filed: Mar. 5, 2014

(65) Prior Publication Data

US 2014/0253845 A1    Sep. 11, 2014

(30) Foreign Application Priority Data

Mar. 5, 2013  (JP) ................................. 2013-042644

(51) Int. Cl.
 *F21V 8/00* (2006.01)
 *G02F 1/1335* (2006.01)

(52) U.S. Cl.
 CPC ......... *G02B 6/0055* (2013.01); *G02B 6/0038* (2013.01)

(58) Field of Classification Search
 CPC .............................. G02B 6/0055; G02B 6/0038
 See application file for complete search history.

(56) References Cited

U.S. PATENT DOCUMENTS

| | | | | |
|---|---|---|---|---|
| 6,324,011 B1* | 11/2001 | Higuchi | ................. | G02B 5/124 359/454 |
| 2003/0223710 A1* | 12/2003 | Helbing | ............... | G02B 6/3801 385/95 |
| 2007/0127266 A1* | 6/2007 | Sugiura | ......................... | 362/615 |
| 2009/0289746 A1* | 11/2009 | Ligander | ................ | H01P 1/208 333/208 |
| 2010/0053493 A1 | 3/2010 | Kuwajima et al. | | |
| 2010/0053993 A1* | 3/2010 | Hong et al. | .................... | 362/606 |
| 2010/0157623 A1* | 6/2010 | Tanahashi | ............ | G02B 6/0043 362/606 |
| 2010/0289980 A1* | 11/2010 | Husemann et al. | ............ | 349/58 |
| 2011/0292318 A1* | 12/2011 | Nakamoto | ............. | G02B 6/003 349/62 |
| 2012/0275182 A1* | 11/2012 | Chen | ............................ | 362/602 |

FOREIGN PATENT DOCUMENTS

| | | | | |
|---|---|---|---|---|
| CN | 101685222 | * | 3/2010 | ............. B32B 37/12 |
| CN | 201487832 | * | 5/2010 | ............. F21V 13/04 |
| CN | 202521384 | * | 11/2012 | ............. F21S 8/00 |
| CN | 202521384 U | * | 11/2012 | ............. F21S 8/00 |
| JP | 2010-62016 | | 3/2010 | |

* cited by examiner

*Primary Examiner* — Edward Glick
*Assistant Examiner* — Anthony G Quash
(74) *Attorney, Agent, or Firm* — Typha IP LLC

(57) ABSTRACT

A liquid crystal display device includes: a light guide plate that includes upper, lower and side surfaces; a light emitting element disposed to face an edge surface that is a part of the side surfaces; a reflection sheet that is bent to face the lower surface of the light guide plate and parts of the side surfaces thereof except for the edge surface; and an adhesive material disposed on the reflection sheet in a planar shape of dots or stripes and attaches the reflection sheet to the light guide plate. The lower surface of the light guide plate includes concaves and convexes formed to cause light that advances in the light guide plate to be reflected inside and to advance toward the upper surface. The thickness of the adhesive material is smaller than a maximum value of a height difference of the concaves and convexes.

9 Claims, 10 Drawing Sheets

LIQUID CRYSTAL DISPLAY DEVICE

CROSS-REFERENCE TO RELATED APPLICATION

The present application claims priority from Japanese application JP2013-42644 filed on Mar. 5, 2013, the content of which is hereby incorporated by reference into this application.

BACKGROUND OF THE INVENTION

1. Field of the Invention

The present invention relates to a liquid crystal display device.

2. Description of the Related Art

A backlight of a liquid crystal display device includes a light guide plate that converts a point light source to a surface light source, in which a light emitting element is disposed to face an edge surface of the light guide plate (see JP 2010-62016 A). Light emitted from the light emitting element that is the point light source is incident onto the edge surface of the light guide plate, and is emitted by reflection to a liquid crystal display panel from a front surface of the light guide plate. The light emitting element and the light guide plate are accommodated in a frame. The frame is formed of a material having a high light reflectance, and reflects light output from side surfaces of the light guide plate to be returned to the light guide plate.

In a liquid crystal display panel for use in a smart phone, it is necessary to narrow the area around the edge of an image display area. In particular, the demand for the narrow edge area on the lateral sides of an image display area is quite severe. For this reason, it is also necessary to reduce the width of a frame. However, the frame formed by injection molding of resin has a limit of the width reduction in view of moldability and reliability due to fluidity of the resin.

SUMMARY OF THE INVENTION

An advantage of some aspects of the invention is to provide a liquid crystal display device including a backlight capable of providing a narrow edge area.

(1) According to an aspect of the invention, there is provided a liquid crystal display device including: a liquid crystal display panel; a light guide plate that includes an upper surface, a lower surface and side surfaces, in which the upper surface is disposed to face the liquid crystal display panel; a light emitting element that is disposed to face an edge surface that is a part of the side surfaces of the light guide plate; a reflection sheet that is bent to face the lower surface of the light guide plate and parts of the side surfaces thereof except for the edge surface; and an adhesive material that is disposed on the reflection sheet in a planar shape of dots or stripes and attaches the reflection sheet to the light guide plate, in which the lower surface of the light guide plate includes concaves and convexes formed to cause light that advances in the light guide plate to be reflected inside and to advance toward the upper surface, and the thickness of the adhesive material is smaller than a maximum value of a height difference of the concaves and convexes. According to this aspect of the invention, as the reflection sheet is attached to the light guide plate, it is possible to remove a frame. Further, due to the adhesive material, it is possible to reduce a gap between the light guide plate and the reflection sheet. Since the adhesive material is provided in the shape of dots or stripes, the adhesive material is not attached to the entire surface of the light guide plate, and thus, light leakage from the boundary surfaces of the light guide plate is small.

(2) In the liquid crystal display device according to (1), the reflection sheet may be formed with a cut line of a dashed line shape for bending.

(3) In the liquid crystal display device according to (1) or (2), the reflection sheet may be attached to the parts of the side surfaces of the light guide plate, except for the edge surface which the light emitting element faces and a different edge surface on a side opposite to the edge surface.

(4) The liquid crystal display device according to (3) may further include blocks respectively disposed on a side where the light emitting element is disposed and on a side opposite to the light emitting element so that the light guide plate is interposed therebetween.

(5) The liquid crystal display device according to any one of (1) to (4) may further include a double-sided light shielding tape that is disposed between the liquid crystal display panel and the light guide plate.

(6) In the liquid crystal display device according to (5), the double-sided light shielding tape may be attached to only each end portion of the light guide plate on a side which the light emitting element faces and a different end portion thereof on a side opposite to the end portion.

(7) In the liquid crystal display device according to (5), the double-sided light shielding tape may be attached to an entire peripheral portion of the light guide plate.

(8) The liquid crystal display device according to any one of (1) to (7) may further include a metal frame that accommodates the light guide plate and the light emitting element on a side opposite to the liquid crystal display panel.

DETAILED DESCRIPTION OF THE INVENTION

Hereinafter, embodiments of the invention will be described with reference to the accompanying drawings.

Figure 1:
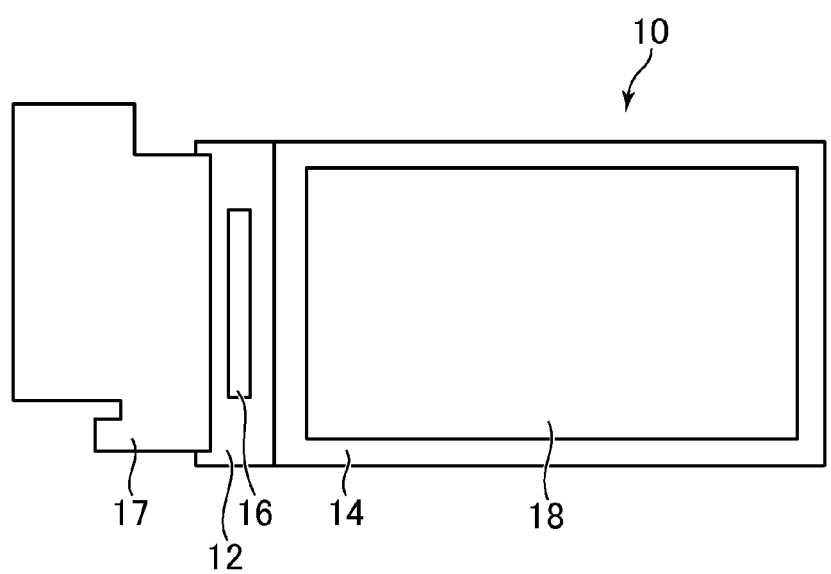
FIG. 1 is a plan view illustrating a liquid crystal display device according to an embodiment of the invention.

FIG. 1 is a plan view illustrating a liquid crystal display device according to an embodiment of the invention. The liquid crystal display device includes a liquid crystal display panel 10. The liquid crystal display panel 10 includes a pair of substrates 12 and 14 (either of which is a glass substrate, for example). A liquid crystal (not shown) is interposed between the substrates 12 and 14. One substrate 12 is a thin film transistor (TFT) substrate (or array substrate) that is provided with TFTs, pixel electrodes, wirings and the like, which are not shown, and the other substrate 14 is a color filter substrate.

The substrate 12 of the liquid crystal display panel 10 includes a protruding portion that protrudes from the substrate 14. An integrated circuit chip 16 in which a driver circuit for driving the liquid crystal is built is mounted on the liquid crystal display panel 10 (specifically, on the protruding portion), and a flexible wiring substrate 17 is attached to the liquid crystal display panel 10 (specifically, on the protruding portion). Polarizing plates 18 are respectively attached to the pair of substrates 12 and 14 of the liquid crystal display panel 10. The liquid crystal display device includes an edge light type backlight, which is not shown in FIG. 1.

Figure 2:
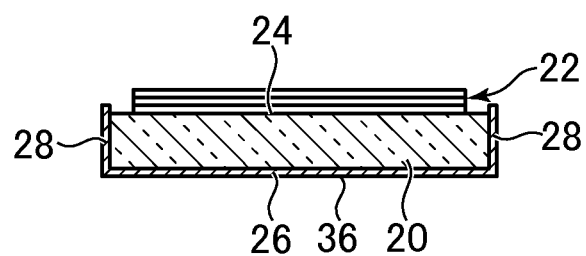
FIG. 2 is a cross-sectional view of a backlight.

FIG. 2 is a cross-sectional view of the backlight. The backlight includes a light guide plate 20. The light guide plate 20 is disposed to overlap the liquid crystal display panel 10. An optical sheet 22 is disposed between the liquid crystal display panel 10 and the light guide plate 20. The optical sheet 22 includes a diffusion sheet, a prism sheet and the like.

Figure 3:
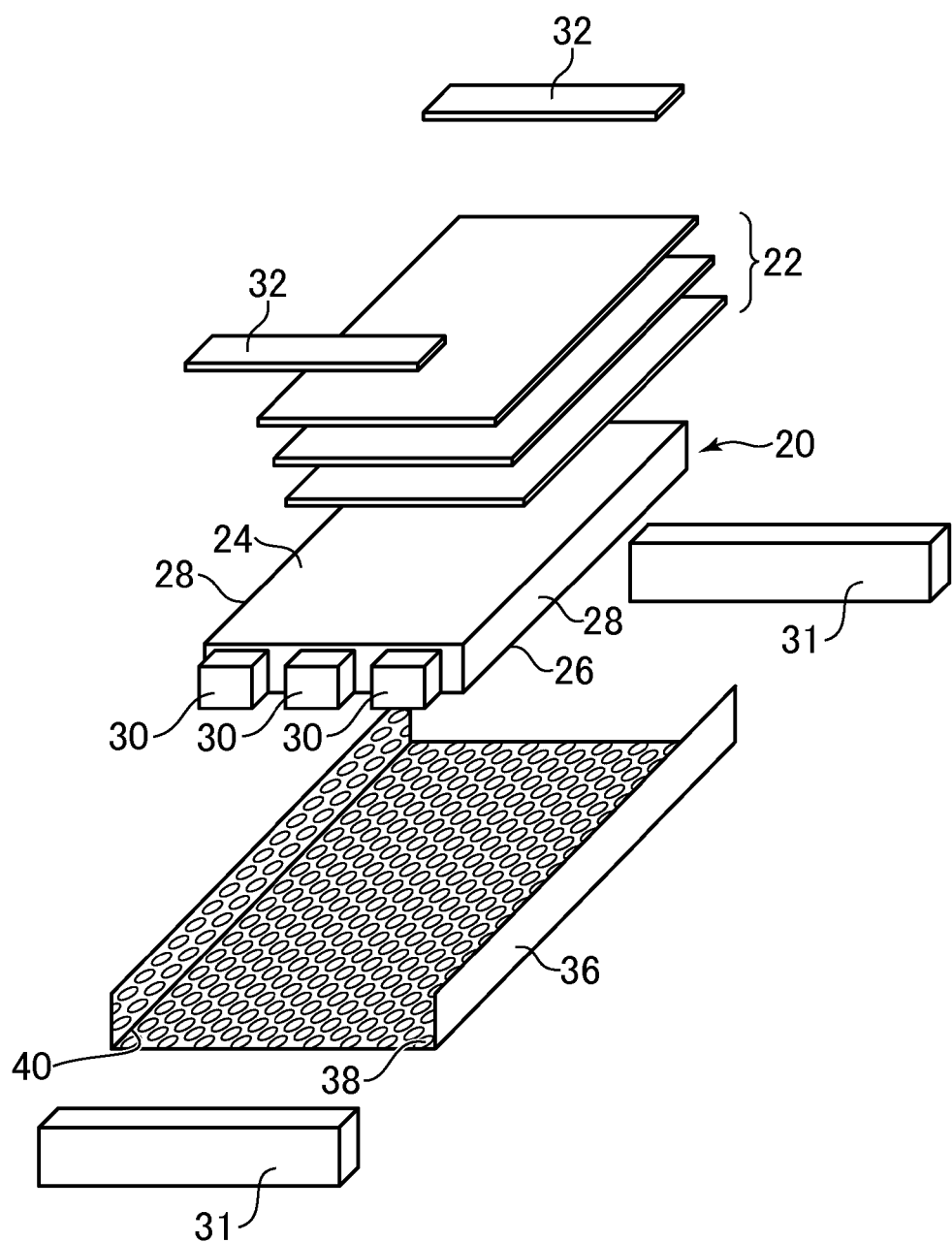
FIG. 3 is an exploded perspective view of the backlight.

FIG. 3 is an exploded perspective view of the backlight. The light guide plate 20 includes an upper surface 24, a lower surface 26 that is a surface opposite to the upper surface 24, and side surfaces 28. The side surfaces 28 are peripheral edge surfaces that connect the upper surface 24 and the lower surface 26. The light guide plate 20 is disposed so that the upper surface 24 faces the liquid crystal display panel 10.

The backlight includes plural light emitting elements 30. The light emitting elements 30 are disposed to face an edge surface that is a part of the side surfaces 28 of the light guide plate 20. The light emitting elements 30 are light emitting diodes, for example. The light emitting elements 30 are point light sources for introducing light into the light guide plate 20. The light from the point light sources are converted into a surface light source in the light guide plate 20, which is emitted to the liquid crystal display panel 10. The plural light emitting elements 30 are arranged in a row.

Double-sided light shielding tapes 32 are disposed between the liquid crystal display panel 10 and the light guide plate 20. The liquid crystal display panel 10 and the light guide plate 20 are fixed to each other by the double-sided light shielding tapes 32. The double-sided light shielding tapes 32 are respectively attached to opposite end portions, in a length direction, of the upper surface 24 of the light guide plate 20. Due to a light shielding function of the double-sided light shielding tapes 32, light from the opposite end portions of the light guide plate 20 is prevented from being incident onto the liquid crystal display panel 10. The double-sided light shielding tape 32 is attached to the end portion adjacent to the edge surface which the light emitting elements 30 of the light guide plate 20 face. Further, the double-sided light shielding tape 32 is also attached to the other end portion on a side opposite to the end portion adjacent to the edge surface which the light emitting elements 30 face. The double-sided light shielding tapes 32 are not attached to other portions.

Figure 4:
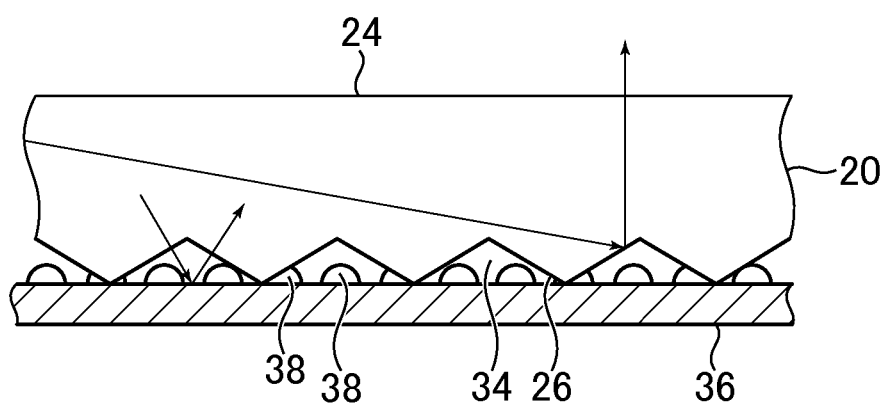
FIG. 4 is a cross-sectional view illustrating a lower surface of a light guide plate.

FIG. 4 is a cross-sectional view illustrating the lower surface 26 of the light guide plate 20. The lower surface 26 of the light guide plate 20 includes concaves and convexes. The concaves are provided as grooves 34, for example. The depth of the grooves 34 is 2 μm to 20 μm, for example. Due to the concaves and convexes, light that advances in the light guide plate 20 is reflected inside, and then advances toward the upper surface 24. Further, light that passes through the lower surface 26 of the light guide plate 20 is reflected from a reflection sheet 36 disposed to face the lower surface 26, and is incident onto the light guide plate 20 through the lower surface 26. As shown in FIG. 3, the reflection sheet 36 faces the lower surface 26 of the light guide plate 20, and faces, by being bent, the parts of the side surfaces 28 of the light guide plate 20, except for the edge surface which the light emitting elements 30 face.

As shown in FIG. 4, the reflection sheet 36 is attached to the light guide plate 20 by an adhesive material 38. Since the light guide plate 20 and the reflection sheet 36 are not separated from each other by the adhesive material 38, it is possible to reduce a gap between the light guide plate 20 and the reflection sheet 36. Further, as the reflection sheet 36 is attached to the light guide plate 20, it is possible to remove a frame. The adhesive material 38 is provided in a dot-like planar shape on the reflection sheet 36 (see FIG. 3). For example, using a liquid adhesive, the adhesive material 38 is provided to form a dome shape by surface tension. As the adhesive material 38 is provided in the shape of dots, the adhesive material 38 is not attached to the entire surface of the light guide plate 20, and thus, light leakage from the boundary surfaces of the light guide plate 20 is small.

The thickness (for example, 10 μm) of the adhesive material 38 is smaller than a maximum value (for example, 20 μm) of a height difference of the concaves and convexes. In the example shown in FIG. 4, since the grooves 34 are deep, the adhesive material 38 is not attached to the bottoms of the grooves 34. As shown in FIG. 3, the reflection sheet 36 is attached to the parts of the side surfaces 28 of the light guide plate 20, except for the edge surface which the light emitting elements 30 face and the other edge surface on a side opposite to the former edge surface.

As shown in FIG. 3, blocks 31 are respectively disposed on the side where the light emitting elements 30 are arranged and on the side opposite to the light emitting elements 30, with the light guide plate 20 being interposed therebetween. The blocks 31 are formed by molding of resin. Reinforcement of the backlight is achieved by the blocks 31. Further, if front surfaces of the blocks 31 are configured to reflect light, it is possible to reflect light leaked from the side surfaces 28 of the light guide plate 20 by the blocks 31 and to return the reflected light into the light guide plate 20.

Figure 5A:
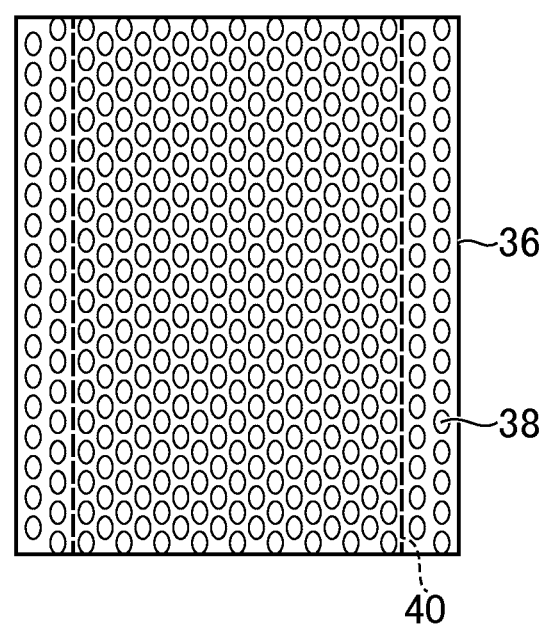
FIG. 5A is a development plan view of a reflection sheet.
Figure 5B:
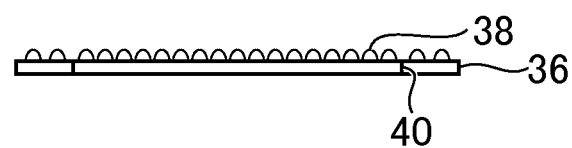
FIG. 5B is a side view of the developed reflection sheet.

FIG. 5A is a plan view in which the reflection sheet 36 shown as being bent in the above description is developed, and FIG. 5B is a side view of the developed reflection sheet 36. Cut lines 40 of a dashed line shape (for example, a perforation) are formed in the reflection sheet 36 for bending. Due to the cut lines 40, it is possible to easily bend the reflection sheet 36.

Figure 6A:
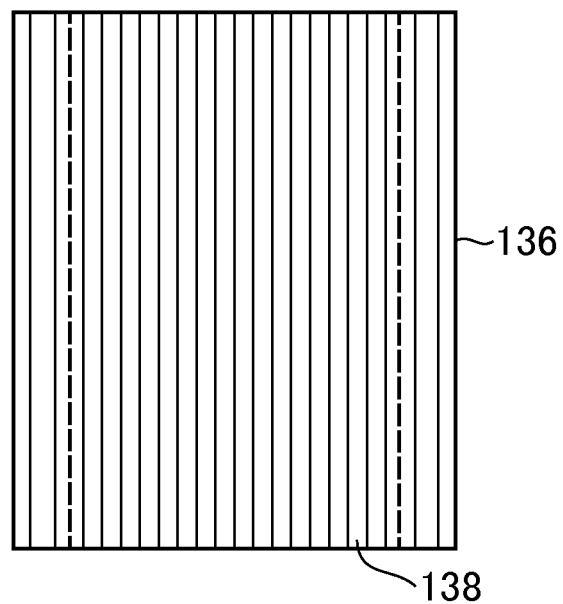
FIG. 6A is a development plan view of a reflection sheet according to a first modification example.
Figure 6B:
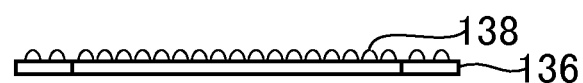
FIG. 6B is a side view of the developed reflection sheet according to the modification example.

FIG. 6A is a development plan view of a reflection sheet 136 according to a first modification example, and FIG. 6B is a side view of the developed reflection sheet 136 according to the modification example. In this modification example, an adhesive material 138 is provided on the reflection sheet 136 in a planar shape of stripes. Even with the stripe shape, since the adhesive material 138 is not attached to the entire surface of the light guide plate 20, light leakage from the boundary surfaces of the light guide plate 20 is small.

Figure 7:
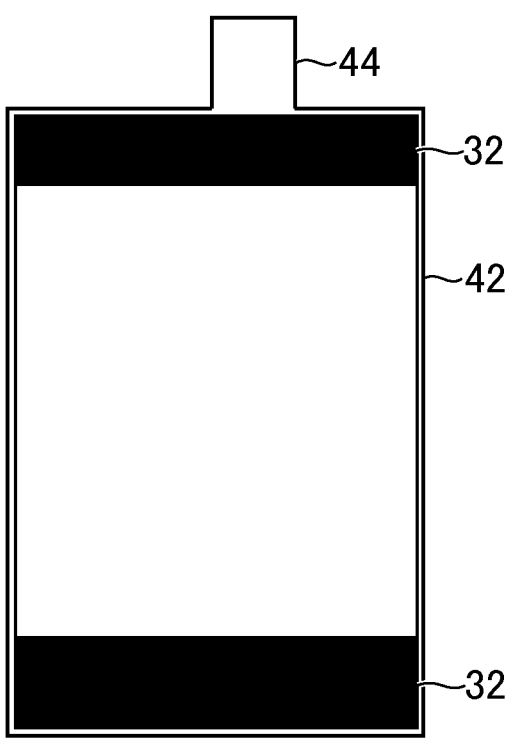
FIG. 7 is a diagram illustrating a member used in a manufacturing process of a liquid crystal display device.

FIG. 7 is a diagram illustrating a member used in a manufacturing process of a liquid crystal display device. The double-sided light shielding tapes 32 described above, used for the fixing of the liquid crystal display panel 10 and the light guide plate 20 are disposed at the opposite end portions in the length direction of the light guide plate 20 (see FIG. 3). For ease of handling that includes positioning of the tapes 32, as shown in FIG. 7, it is preferable that the double-sided light shielding tapes 32 be attached in advance to a protection film 42 for preparation. By attaching one surface of the double-sided light shielding tapes 32 onto the light guide plate 20 in a state where the protection film 42 is attached to the other surface of the double-sided light shielding tapes 32, it is possible to simply attach the double-sided light shielding tapes 32 onto the light guide plate 20. If the protection film 42 is disposed to cover an upper side of the optical sheet 22 (see FIG. 3), it is possible to retain the optical sheet 22. The protection film 42 protects the members (the light guide plate 20 and the optical sheet 22) disposed below the protection film 42. The protection film 42 is provided with a tap 44 (protruding portion), and thus, separation thereof from the double-sided light shielding tapes 32 becomes easy.

Figure 8:
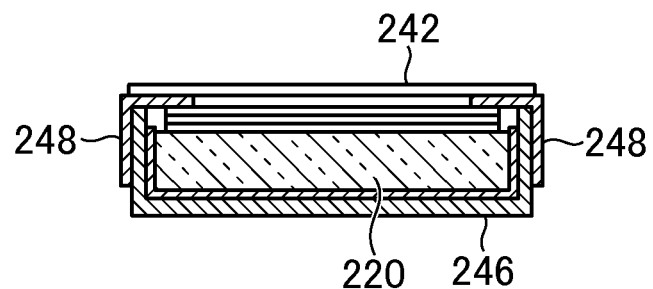
FIG. 8 is a diagram illustrating a backlight of a liquid crystal display device according to a second modification example.

FIG. 8 is a diagram illustrating a backlight of a liquid crystal display device according to a second modification example. In this modification example, the backlight includes a metal frame 246, and thus has high strength. The metal frame 246 accommodates a light guide plate 220 and the light emitting elements 30 (see FIG. 3) on a side opposite to the liquid crystal display panel 10 (see FIG. 1). Double-sided tapes 248 for fixing the metal frame 246 are attached to a protection film 242. The double-sided tapes 248 are attached to a lower surface of the protection film 242 (surface to which double-sided light shielding tapes (not shown) are attached) to be protruded from the protection film 242, are bent in a direction where the lower surface of the protection film 242 is directed, and are attached to outer side surfaces of the metal frame 246. A surface of the double-sided tape 248 on a side opposite to the surface thereof attached to the metal frame 246 is an adhesive surface, but is exposed without attachment.

Figure 9:
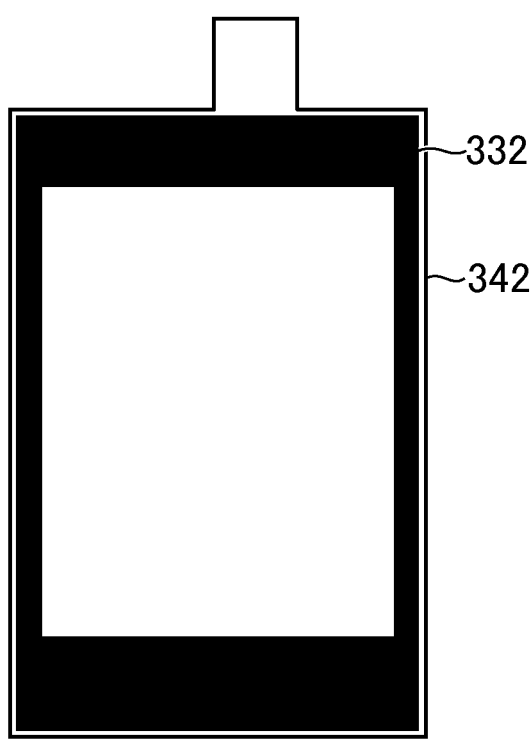
FIG. 9 is a diagram illustrating a member used in a manufacturing process of a liquid crystal display device according to a third modification example.

FIG. 9 is a diagram illustrating a member used in a manufacturing process of a liquid crystal display device according to a third modification example. In this example, a double-sided light shielding tape 332 is formed in a frame shape that surrounds a central opening thereof, and is attached to a protection film 342 along a peripheral portion thereof to surround a central region thereof. The double-sided light shielding tape 332 is provided to surround an image display area (not shown) of the liquid crystal display panel 10 (see FIG. 1).

Figure 10:
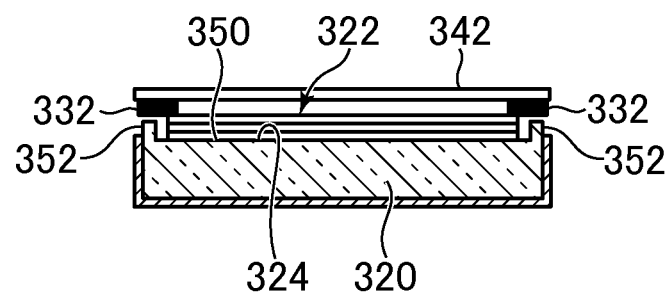
FIG. 10 is a cross-sectional view illustrating a backlight to which a double-sided light shielding tape shown in FIG. 9 is attached.

FIG. 10 is a cross-sectional view illustrating a backlight to which the double-sided light shielding tape 332 shown in FIG. 9 is attached. In this example, the double-sided light shielding tape 332 is attached to the entire peripheral portion of a light guide plate 320. The light guide plate 320 is formed with a concave portion 350 for arrangement of an optical sheet 322 on an upper surface 324 thereof. On a top surface of a convex portion 352 formed around the concave portion 350, the double-sided light shielding tape 332 is attached. A protection film 342 is attached to the double-sided light shielding tape 332, which is disposed to cover the optical sheet 322.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a liquid crystal display panel;
   a light guide plate that includes an upper surface, a lower surface and side surfaces, in which the upper surface is disposed to face the liquid crystal display panel;
   a light emitting element that is disposed to face an edge surface that is a part of the side surfaces of the light guide plate;
   a reflection sheet that is bent to face the lower surface of the light guide plate and parts of the side surfaces thereof except for the edge surface; and
   adhesive materials that are disposed on the reflection sheet in planar shapes of a plurality of dots to attach the reflection sheet to the light guide plate, each of the plurality of dots having a dome shape by surface tension,
   wherein the lower surface of the light guide plate includes depressions and protrusions formed to cause light that advances in the light guide plate to be reflected inside and to advance toward the upper surface,
   wherein each of the protrusions has a top touching the reflection sheet,
   wherein each of the depressions has a bottom facing a corresponding one of the adhesive materials with a distance therebetween,
   wherein some of the plurality of dots are disposed in the depressions and do not contact the light guide plate, and
   wherein each of the adhesive materials has a thickness smaller than a maximum value of a height difference of the depressions and protrusions, the distance between the bottom of each of the depressions and the corresponding one of the adhesive materials being smaller than the maximum value of the height difference.

2. The liquid crystal display device according to claim 1, wherein the reflection sheet is formed with a cut line of a dashed line shape for bending.

3. The liquid crystal display device according to claim 1, wherein the reflection sheet is attached to the parts of the side surfaces of the light guide plate, except for the edge surface which the light emitting element faces and a different edge surface on a side opposite to the edge surface.

4. The liquid crystal display device according to claim 3, further comprising:
   blocks respectively disposed on a side where the light emitting element is disposed and on a side opposite to the light emitting element so that the light guide plate is interposed therebetween.

5. The liquid crystal display device according to claim 1, further comprising:
   a double-sided light shielding tape that is disposed between the liquid crystal display panel and the light guide plate.

6. The liquid crystal display device according to claim 5, wherein the double-sided light shielding tape is attached to only each end portion of the light guide plate on a side which the light emitting element faces and a different end portion thereof on a side opposite to the end portion.

7. The liquid crystal display device according to claim 5, wherein the double-sided light shielding tape is attached to an entire peripheral portion of the light guide plate.

8. The liquid crystal display device according to claim 1, further comprising:
a metal frame that accommodates the light guide plate and the light emitting element on a side opposite to the liquid crystal display panel.

9. The liquid crystal display device according to claim 1,
wherein the reflection sheet has a first surface which faces the lower surface of the light guide plate and a second surface which faces the side surface of the light guide palate except for the edge surface,
wherein the adhesive materials are provided on the first surface and the second surface of the reflection sheet, and
wherein the second surface of the reflection sheet is attached to the side surface of the light guide plate with the adhesive materials.

* * * * *